US010753227B2

(12) United States Patent
Arnold et al.

(10) Patent No.: US 10,753,227 B2
(45) Date of Patent: Aug. 25, 2020

(54) TURBOCHARGER WITH TEMPERATURE-CONTROLLED BEARING LOCATING FASTENER

(71) Applicant: HONEYWELL INTERNATIONAL INC., Morris Plains, NJ (US)

(72) Inventors: Philippe Arnold, Hennecourt (FR); Denis Jeckel, TLV (FR); Christophe Riviere, Aydoilles (FR)

(73) Assignee: GARRETT TRANSPORTATION I INC, Torrance, CA (US)

(*) Notice: Subject to any disclaimer, the term of this patent is extended or adjusted under 35 U.S.C. 154(b) by 235 days.

(21) Appl. No.: 15/867,072

(22) Filed: Jan. 10, 2018

(65) Prior Publication Data
US 2019/0211706 A1 Jul. 11, 2019

(51) Int. Cl.
F01D 25/10 (2006.01)
F01D 25/16 (2006.01)
F01D 25/28 (2006.01)
F01D 25/18 (2006.01)
F16C 17/10 (2006.01)
F04D 29/056 (2006.01)
F16C 27/02 (2006.01)
F16C 33/10 (2006.01)
(Continued)

(52) U.S. Cl.
CPC ............. *F01D 25/10* (2013.01); *F01D 25/16* (2013.01); *F01D 25/186* (2013.01); *F01D 25/28* (2013.01); *F04D 29/0563* (2013.01); *F16C 17/10* (2013.01); *F16C 27/02* (2013.01); *F16C 33/1025* (2013.01); *F01D 25/24* (2013.01); *F02B 33/40* (2013.01); *F05D 2220/40* (2013.01); *F05D 2240/60* (2013.01); *F05D 2260/30* (2013.01); *F16C 2360/24* (2013.01)

(58) Field of Classification Search
CPC .... F16C 17/243; F16C 27/02; F16C 33/1025; F16C 2360/24; F01D 25/16; F01D 25/186; F01D 25/24; F01D 25/28; F02B 33/40; F05D 2220/40; F05D 2240/60; F04D 29/0563
See application file for complete search history.

(56) References Cited

U.S. PATENT DOCUMENTS 4,240,678 A * 12/1980 Sarle ..................... F01D 25/166
384/369
5,028,208 A * 7/1991 Mitsubori ............. F01D 17/165
415/150

(Continued)

FOREIGN PATENT DOCUMENTS

DE 202016105071 U1 11/2016
DE 102015222987 A1 5/2017

(Continued)

Primary Examiner — Igor Kershteyn
Assistant Examiner — Andrew Thanh Bui
(74) Attorney, Agent, or Firm — Lorenz & Kopf, LLP

(57) ABSTRACT

A turbocharger includes a housing and a rotor with a shaft that is housed within the housing. The turbocharger also includes a bearing structure that supports rotation of the shaft within the housing and a locating fastener that retains the bearing structure in a position relative to the housing. Furthermore, the turbocharger includes a heating system coupled to the locating fastener and that is configured for selectively heating the locating fastener.

20 Claims, 6 Drawing Sheets

(51) Int. Cl.
*F01D 25/24* (2006.01)
*F02B 33/40* (2006.01)

(56) References Cited

U.S. PATENT DOCUMENTS

| | | |
|---|---|---|
| 6,365,413 B1 * | 4/2002 | Hall .................. G01N 33/2805 159/12 |
| 7,160,082 B2 | 1/2007 | Allen et al. |
| 9,039,391 B2 | 5/2015 | Marsal et al. |
| 9,488,186 B2 * | 11/2016 | Hornbach ............... F01D 25/18 |
| 2018/0073553 A1 | 3/2018 | Kleinschmidt et al. |

FOREIGN PATENT DOCUMENTS

| | | | |
|---|---|---|---|
| JP | 2011122557 A | | 6/2011 |
| KR | 20150034846 A | * | 4/2015 |
| WO | 2013078117 A1 | | 5/2013 |

* cited by examiner

TURBOCHARGER WITH TEMPERATURE-CONTROLLED BEARING LOCATING FASTENER

TECHNICAL FIELD

The present disclosure generally relates to a turbocharger and, more particularly, relates to a turbocharger with a temperature-controlled bearing locating fastener.

BACKGROUND

Some engine systems include one or more turbochargers. Typically, turbochargers include a turbine wheel and a compressor wheel mounted on a common shaft and carried within isolated turbine and compressor housings, respectively. The turbine wheel may be driven in rotation by exhaust gas output by the engine. This, in turn, rotates the compressor wheel for compressing air that is fed to the combustion chambers of the engine. Accordingly, the turbocharger may provide a performance boost and increased efficiency to the engine.

Turbochargers may need to perform in a variety of operating conditions. For example, in cold weather (i.e., low ambient temperature) conditions, the viscosity of the oil within the turbocharger may be relatively low. This may negatively affect performance of current turbochargers.

Accordingly, it is desirable to provide an improved turbocharger that may selectively control oil viscosity within the turbocharger. It is also desirable to provide an improved turbocharger that selectively controls temperatures to, thereby, affect oil viscosity and improve operating performance of the turbocharger in cold-weather conditions. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger is disclosed that includes a housing and a rotor with a shaft that is housed within the housing. The turbocharger also includes a bearing structure that supports rotation of the shaft within the housing and a locating fastener that retains the bearing structure in a position relative to the housing. Furthermore, the turbocharger includes a heating system coupled to the locating fastener and configured for selectively heating the locating fastener.

In another embodiment, a method of operating a turbocharger system for a vehicle is disclosed. The method includes detecting, by a sensor, a condition. Furthermore, the method includes selectively heating a locating fastener of a turbocharger based on the detected condition. The locating fastener retains a bearing structure in a position relative to a housing of the turbocharger. The bearing structure supports rotation of a rotor shaft of the turbocharger within the housing.

In a further embodiment, a turbocharger is disclosed that includes a bearing housing and a rotor with a compressor wheel, a turbine wheel, and a shaft that connects the compressor wheel and the turbine wheel. The shaft is housed within the bearing housing. The turbocharger further includes a journal bearing structure that supports rotation of the shaft within the bearing housing about an axis. Also, the turbocharger includes a locating pin that extends radially with respect to the axis through the bearing housing and the journal bearing structure to fix the journal bearing structure against rotation about the axis relative to the bearing housing. The locating pin includes an end that is received within a lubricant area defined between an outer diameter surface of the shaft and an inner diameter surface of the journal bearing structure. Furthermore, the turbocharger includes a heating system that is coupled to the locating pin. The heating system includes a sensor configured to detect an ambient temperature condition. The heating system is configured for selectively heating the locating pin based on the detected ambient temperature condition.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbocharger with improved characteristics. In particular, example embodiments include a turbocharger with a journal bearing structure that supports rotation of a turbocharger shaft within a housing. A lubricant area may be defined between an outer diameter surface of the turbocharger shaft and an inner diameter surface of the journal bearing structure.

The turbocharger may also include a locating fastener, such as a locating pin, that retains the journal bearing structure in a position relative to the housing. The locating fastener may be exposed to the lubricant area.

Furthermore, the turbocharger may include a heating system configured to selectively heat the locating fastener. The locating fastener may be selectively heated, for example, in cold weather conditions. As a result, the lubricant within the lubricant area may be selectively heated to change viscosity and affect the cold-weather performance of the turbocharger.

Figure 1:
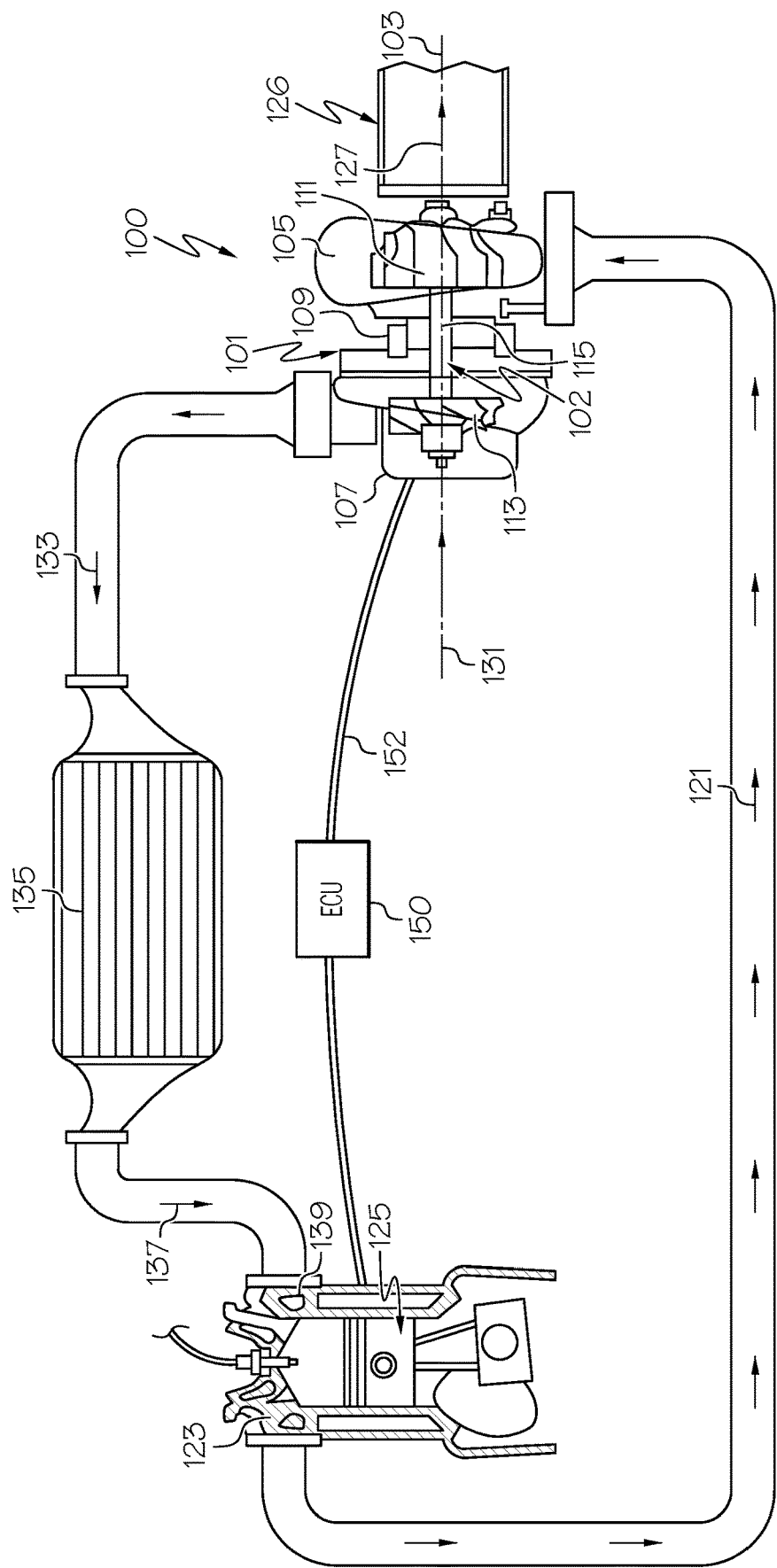
FIG. 1 is a schematic illustration of a turbocharger system configured according to example embodiments of the present disclosure.

FIG. 1 is a schematic view of a turbocharger 100 that includes a turbocharger housing 101 and a rotor 102. The rotor 102 is configured to rotate within the turbocharger housing 101 about an axis of rotor rotation 103. The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, as will be discussed, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis of rotation 103, through the bearing housing 109, to connect the turbine wheel 111 to the compressor wheel 113. Accordingly, the turbine wheel 111 and the compressor wheel 113 rotate together about the axis 103.

It will be appreciated that these features of the turbocharger 100 may vary from the illustrated embodiments. For example, the turbine wheel 111 may be configured as a radial, axial, or mixed turbine wheel. Also, the term "turbocharger" is intended to be broad in scope and generically to apply to the type of turbochargers illustrated, to superchargers, electric chargers (e-chargers), and similar devices for boosting engine performance.

The turbine housing 105 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 (and thus the rotor 102) is driven in rotation around the axis 103 by the high-pressure and high-temperature exhaust gas stream 121, which becomes a lower-pressure and lower-temperature exhaust gas stream 127 and is axially released into an exhaust system 126. In other embodiments, the engine 125 may be of another type, such as a diesel fueled engine.

The compressor housing 107 and compressor wheel 113 form a compressor stage. The compressor wheel 113, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature, over that of the input air.

In some embodiments, the pressurized air stream 133 may be channeled through an air cooler 135 (i.e., intercooler), such as a convectively cooled charge air cooler. The air cooler 135 may be configured to dissipate heat from the pressurized air stream 133, increasing its density. The resulting cooled and pressurized output air stream 137 is channeled into an intake manifold 139 on the internal combustion engine 125, or alternatively, into a subsequent-stage, in-series compressor. The operation of the system is controlled by an ECU 150 (engine control unit) that connects to the remainder of the system via communication connections 152.

Figure 2:
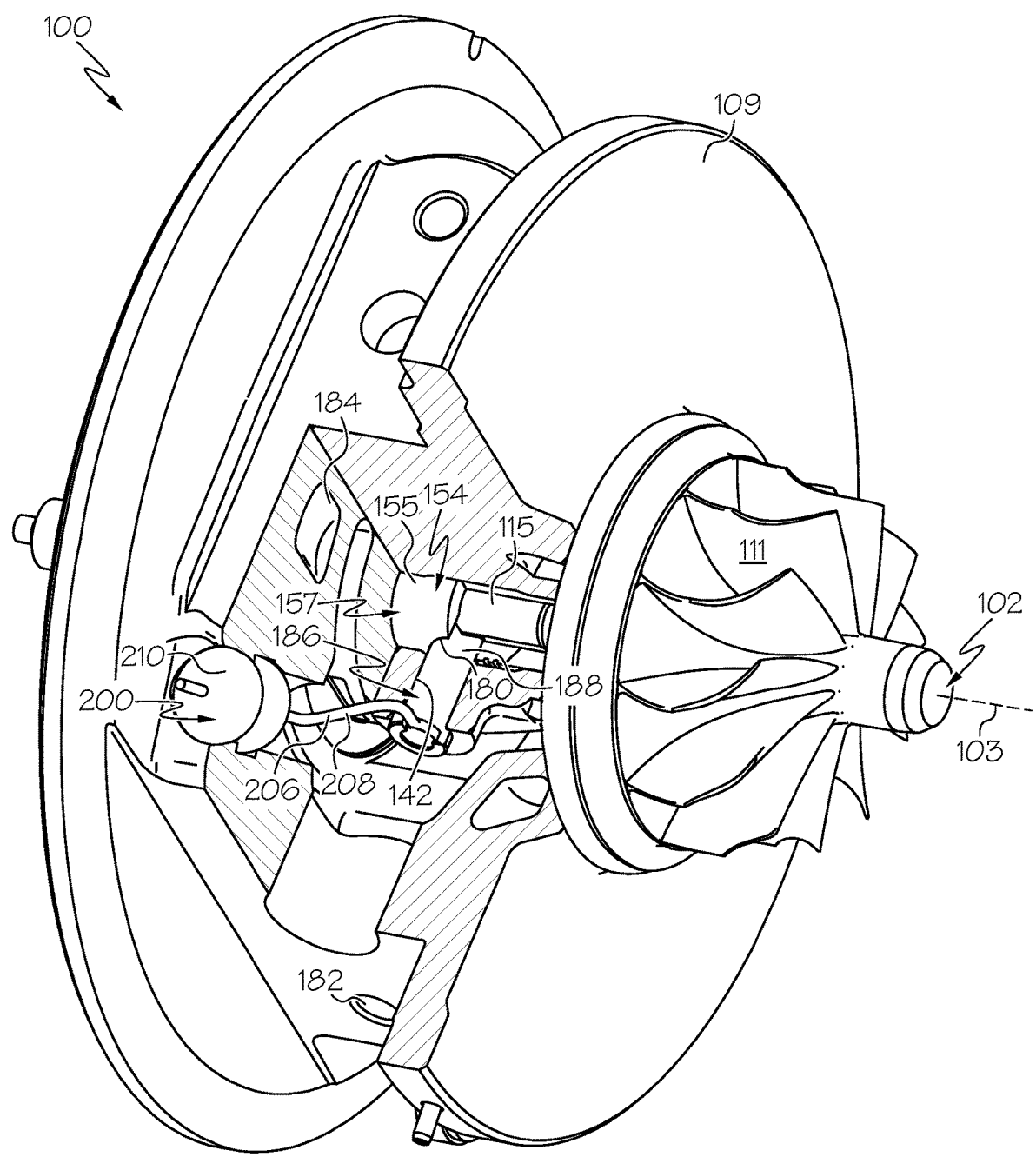
FIG. 2 is a sectioned perspective view of a turbocharger of the turbocharger system of FIG. 1 according to example embodiments.
Figure 3:
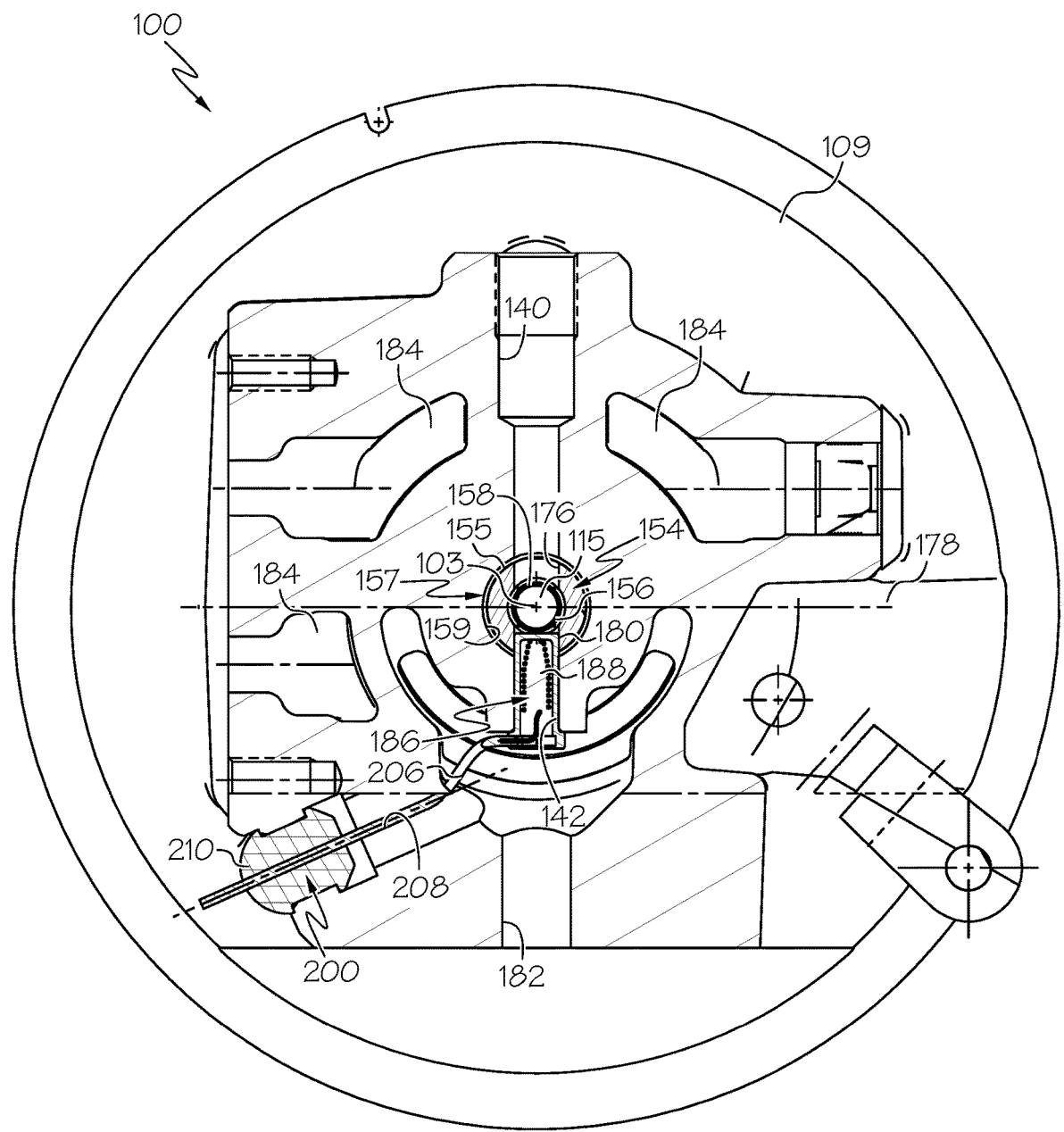
FIG. 3 is an axial section view of the turbocharger of FIG. 2.
Figure 4:
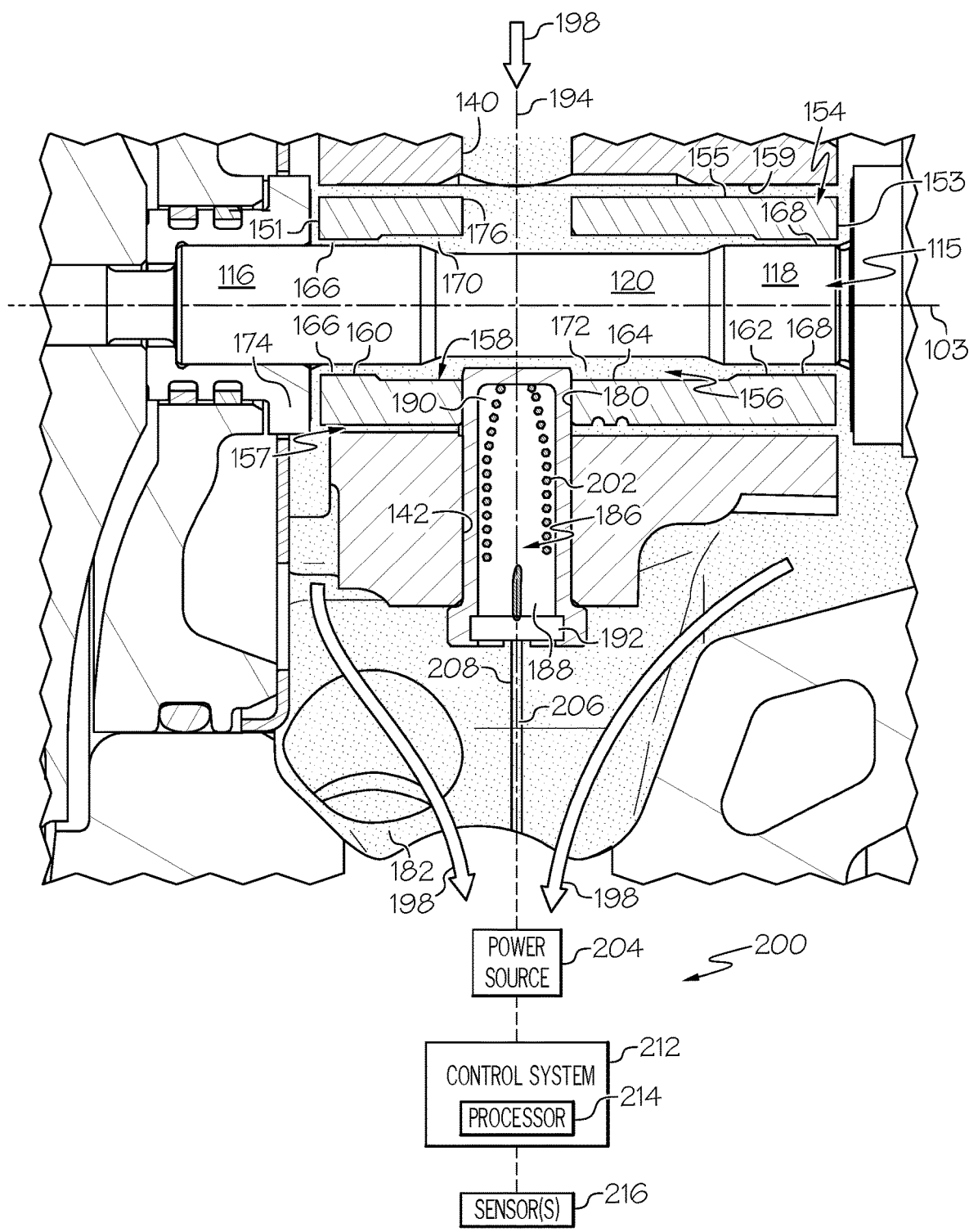
FIG. 4 is a longitudinal section view of the turbocharger of FIG. 2.

Referring now to FIGS. 2-4, features of the turbocharger 100 are shown in detail according to example embodiments. In FIG. 2, a portion of the bearing housing 109 (i.e., the central housing) is shown, and a portion is shown sectioned away. Also, the rotor 102 is shown, including the turbine wheel 111 and the shaft 115. Other portions of the turbocharger 100 are omitted and/or hidden from view.

The shaft 115 may be supported for rotation about the axis 103 as discussed above. As shown in FIG. 4, the diameter of the shaft 115 may vary along the axis 103. For example, the shaft 115 may include a first portion 116, a second portion 118, and an intermediate portion 120 disposed between the first and second portions 116, 118. The intermediate portion 120 may have a smaller diameter as compared to the first and second portions 116, 118.

Also, the turbocharger 100 may include a bearing structure 154 that supports rotation of the shaft 115 within the bearing housing 109. A portion of the bearing structure 154 is sectioned away in FIG. 2 to reveal the shaft 115. However, as shown in FIGS. 3 and 4, the bearing structure 154 may be cylindrical and hollow. In some embodiments, the bearing structure 154 may be a one-piece, monolithic structure. In some embodiments, the bearing structure 154 is made of a thermally conductive material, such as copper. The bearing structure 154 may include an axial opening 156 that extends along the axis 103 and that is substantially centered thereon. The axial opening 156 receives the shaft 115 of the rotor 102. As shown in FIG. 4, the bearing structure 154 includes a first end 151, which may be directed toward the compressor stage of the turbocharger 100, and a second end 153, which may be directed toward the turbine stage of the turbocharger 100.

The bearing structure 154 may also include an outer diameter surface 155. The outer diameter surface 155 may face radially away from the axis 103.

The bearing structure 154 may be received within a central cavity 157 of the bearing housing 109. The central cavity 157 may be defined by an inner surface 159 (FIGS. 3 and 4) of the bearing housing 109. Thus, the outer diameter surface 155 of the bearing structure 154 may face opposite the inner surface 159 of the central cavity 157.

The bearing housing 109 may include an oil inlet passage 140. As will be discussed, the oil inlet passage 140 may provide oil to the bearing structure 154 and the shaft 115 for supporting rotation of the shaft 115. The bearing housing 109 may also include a fastener aperture 142. The fastener aperture 142 may be a through-hole that extends transverse (e.g., normal to) the axis 103. As shown in FIG. 3, the oil inlet passage 140 and the fastener aperture 142 may be circumferentially disposed on opposite sides of the axis 103 (i.e., clocked apart approximately 180 degrees about the axis 103). As shown in FIG. 3, the oil inlet passage 140 may be disposed above the axis 103 and the fastener aperture 142 may be disposed below the axis 103. Also, the oil inlet passage 140 may be aligned as shown in FIG. 4 or may be spaced apart along the axis 103 in other embodiments of the present disclosure.

Referring now to FIG. 4, the inner diameter profile of the bearing structure 154 will be discussed according to example embodiments. The axial opening 156 of the bearing structure 154 may be defined by an inner diameter surface 158 (FIG. 4). The inner diameter surface 158 may include a first pad area 160 proximate the first end 151, a second pad area 162 proximate the second end 153, and an intermediate area 164 disposed axially between the first pad area 160 and the second pad area 162. The diameter of the inner diameter surface 158 at the first and second pad areas 160, 162 may be smaller than at the intermediate area 164. Stated differently, the intermediate area 164 may be defined by an intermediate recess 170 within the inner diameter surface 158. The intermediate recess 170 may extend axially between the first pad area 160 and the second pad area 162 as shown in FIG. 4.

The inner diameter of the first pad area 160 may closely correspond to the outer diameter of the first portion 116 of the shaft 115. Likewise, the inner diameter of the second pad area 162 may closely correspond to the outer diameter of the second portion 118 of the shaft 115. In comparison, the inner diameter of the intermediate recess 170 of the bearing structure 154 may be substantially larger than the outer diameter of the intermediate portion 120 of the shaft 115.

Accordingly, as shown in FIG. 4, the bearing structure 154 and the shaft 115 may cooperatively define one or more lubricant areas that are configured to receive a lubricant, such as a lubricating oil. For example, a first oil film area 166 (i.e., a small clearance for lubricating oil or other lubricant) may be defined between the first pad area 160 and the first portion 116 of the shaft 115. Similarly, a second oil film area 168 may be defined between the second pad area 162 and the second portion 118 of the shaft 115. Furthermore, an intermediate lubricant area 172 may be defined between the intermediate portion 120 of the shaft 115 and the intermediate area 164 of the bearing structure 154. The intermediate lubricant area 172 may be a relatively large clearance, pocket, aperture, etc. that is defined radially between the inner diameter surface 158 and the intermediate portion 120 of the shaft 115. The intermediate lubricant area 172 may also be defined axially between the first and second oil film areas 166, 168. The intermediate lubricant area 172 may be fluidly connected to the first oil film area 166 and the second oil film area 168 such that lubricant may flow therebetween.

As stated, the shaft 115 may be supported for rotation relative to the bearing structure 154 about the axis 103. The oil film areas 166, 168 and the intermediate lubricant area 172 may provide lubricated rotation of the shaft 115 within the bearing structure 154. Also, the first pad area 160 and the second pad area 162 of the bearing structure 154 may support radial loads of the shaft 115. The turbocharger 100 may further include one or more thrust bearings 174 (FIG. 4) for supporting axial loads of the shaft 115.

Accordingly, in some embodiments, the bearing structure 154 may comprise a journal bearing (i.e., a rotational plain bearing). Also, in some embodiments, the bearing structure 154 may comprise a so-called semi-floating bearing. In some embodiments, the bearing structure 154 and other features of the turbocharger 100 may be configured according to U.S. Pat. No. 7,160,082, issued on Jan. 9, 2007 to Allen et al., and/or according to U.S. Pat. No. 9,039,391, issued on May 26, 2015 to Marsal et al., the entire disclosures of which are incorporated herein by reference. However, it will be appreciated that the turbocharger 100 may be configured differently without departing from the scope of the present disclosure.

As shown in FIGS. 3 and 4, the bearing structure 154 may include a lubricant inlet aperture 176. The lubricant inlet aperture 176 may be a circular through-hole that extends substantially normal to the axis 103 (e.g., along a vertical axis). As shown in FIG. 3, the lubricant inlet aperture 176 may be circumferentially disposed above an imaginary horizontal reference plane 178. The axis 103 may lie within the horizontal reference plane 178. The lubricant inlet aperture 176 may be substantially aligned with the oil inlet passage 140 of the bearing housing 109. Accordingly, lubricating oil may be fed into the inlet passage 140, into the inlet aperture 176 and into the intermediate lubricant area 172. The oil within the intermediate lubricant area 172 may flow axially toward the first oil film area 166 and the second oil film area 168. Moreover, oil at the oil inlet passage 140 may flow between the outer diameter surface 155 of the bearing structure 154 and the inner surface 159 of the central cavity 157 of the bearing housing 109. Likewise, the oil may flow in the spaces between the first end 151 and the thrust bearing 174, between the second end 153 and adjacent structure, and through the bearing housing 109 as represented by arrows 198 in FIG. 4.

The bearing housing 109 may also define various other passages for the lubricating oil. For example, the bearing housing 109 may include an oil outlet 182, for draining oil away from the bearing structure 154. The bearing housing 109 may further include other passages for lubricating oil, for coolant fluids, etc. For example, as shown in FIGS. 2 and 3, the bearing housing 109 may include one or more coolant passages 184.

As shown in FIGS. 2-4, the bearing structure 154 may also include a locating fastener aperture 180. The locating fastener aperture 180 may be a circular through-hole that extends substantially normal to the axis 103 (e.g., along a vertical axis). As shown in FIG. 3, the locating fastener aperture 180 may be circumferentially disposed below the imaginary horizontal reference plane 178. The locating fastener aperture 180 may be substantially aligned with the fastener aperture 142 of the bearing housing 109.

Additionally, the turbocharger 100 may include a locating fastener 186. Generally, the locating fastener 186 may be configured to retain the bearing structure 154 against movement relative to the bearing housing 109 in at least one linear or rotational direction. In some embodiments, the locating fastener 186 may be configured as a locating pin 188 that extends into and that is attached to the bearing housing 109 and the bearing structure 154. However, it will be appreciated that the locating fastener 186 may be configured as a different type of fastener 186 without departing from the scope of the present disclosure.

The locating pin 188 may include a first end 190, a second end 192, and an axis 194 that extends between the first end 190 and the second end 192. The axis 194 may be substantially straight.

The locating pin 188 may be received within the fastener aperture 142 of the bearing housing 109 and the fastener aperture 180 of the bearing structure 154 such that the first end 190 is received within the intermediate lubricant area 172. The second end 192 of the locating pin 188 may seat against a substantially flat mounting surface 196 of the bearing housing 109.

Accordingly, the locating pin 188 may fixedly attach the bearing structure 154 to the bearing housing 109 and retain the bearing structure 154 against rotation about the axis 103. Also, the locating pin 188 may retain the bearing structure 154 in a fixed axial position with respect to the axis 103 and support the axial loads transferred from the thrust bearing 174. Accordingly, the locating pin 188 may indirectly support the axial loads on the shaft 115.

The locating pin 188 may be attached to the bearing housing 109 and the bearing structure 154 in various ways without departing from the scope of the present disclosure. For example, in the embodiment of FIGS. 2-4, the locating pin 188 may be press-fit within the bearing housing 109 and/or the bearing structure 154. In some embodiments, the locating pin 188 may be frictionally fit or interference fit (i.e., via a press) with the bearing housing 109 and clearance fit within the bearing structure 154. In other embodiments that will be discussed, the pin 188 may be threadably attached to the bearing housing 109 and/or the bearing structure 154.

Moreover, the turbocharger 100 may include a heating system 200. The heating system 200 may be configured for selectively heating the locating pin 188. For example, when starting the engine, during cold weather conditions, and/or in other situations, the locating pin 188 may be heated for a predetermined amount of time. Heat from the pin 188 may transfer to the bearing housing 109, to the bearing structure 154, and/or to the lubricating oil therein. Those having ordinary skill in the art will recognize that heating the oil will reduce the viscosity of the oil and can advantageously increase the operating efficiency of the turbocharger 100.

In some embodiments, the heating system 200 may include a heating element 202 (FIG. 4). The heating element 202 may be supported within the locating pin 188. In some embodiments, the heating element 202 may include a coil of resistive material that is wound helically within the locating pin 188. Also, the heating element 202 may be electrically connected to a power source 204 via one or more connecting lines 206 (e.g., electrical wires). Thus, electrical power from the power source 204 may heat the heating element 202 for heating the locating pin 188.

In some embodiments, the connecting line 206 may be routed within a tunnel 208 defined within the bearing housing 109. The tunnel 208 may be isolated and fluidly sealed off from the oil channels (e.g., the oil inlet passage 140, the oil outlet 182, etc.) as well as the coolant passages 184 of the bearing housing 109. Moreover, as shown in FIGS. 2 and 3, the heating system 200 may include a bulb-shaped sealing element 210 that seals off the tunnel 208.

The heating system 200 may further include a control system 212. The control system 212 may include a computerized processor 214 and may be integrated within the ECU 150 of FIG. 1. The control system 212 may include a sensor system having one or more sensors 216. The sensor(s) 216 may include a thermometer that detects ambient temperature, oil temperature, and/or other thermal conditions affecting the turbocharger 100. The sensor(s) 216 may also be speed sensors for measuring engine speed. In some embodiments, the sensor(s) 216 may be an altitude sensor that detects the current altitude (above sea level). The sensor(s) 216 may include flow sensors for measuring airflow to and/or from the compressor section of the turbocharger 100, exhaust flow to and/or from the turbine section of the turbocharger 100.

In some embodiments, the sensor 216 may be a thermometer that detects ambient temperature. The control system 212 receives signals from the sensor 216 indicating the ambient temperature detected by the sensor 216. Upon startup of the engine 125, the processor 214 receives the temperature reading and determines whether the current temperature is below a predetermined threshold. If no (i.e., warm start), then the control system 212 does not heat the locating pin 188. If yes (i.e., cold start), however, then the control system 212 may generate and send a control command to the power source 204. The power source 204 may, in turn, provide power to the heating element 202 for heating the locating pin 188. In some embodiments, the control system 212 may control the power source 204 and automatically shut off power and terminate heating of the locating pin 188 after a predetermined time limit. In some embodiments, the processor 214 may determine the time limit according to temperature or other readings detected by the sensor 216 and/or according to computer logic, an algorithm, look-up table stored in computerized memory, etc. Thus, in some embodiments, in colder weather conditions, the control system 212 may heat the locating pin 188 for longer periods of time before shut off.

Figure 5:
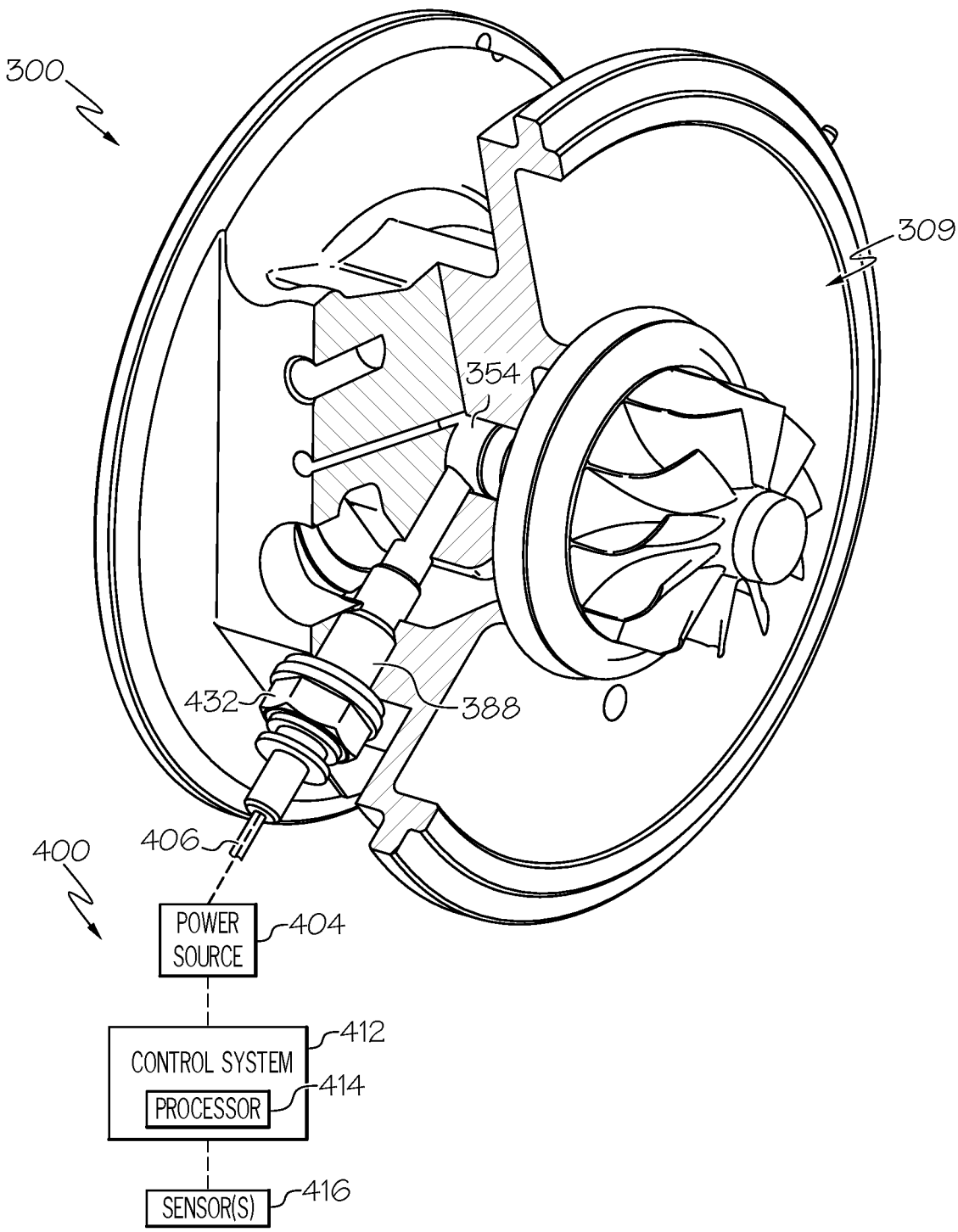
FIG. 5 is a sectioned perspective view of the turbocharger according to additional example embodiments of the present disclosure.
Figure 6:
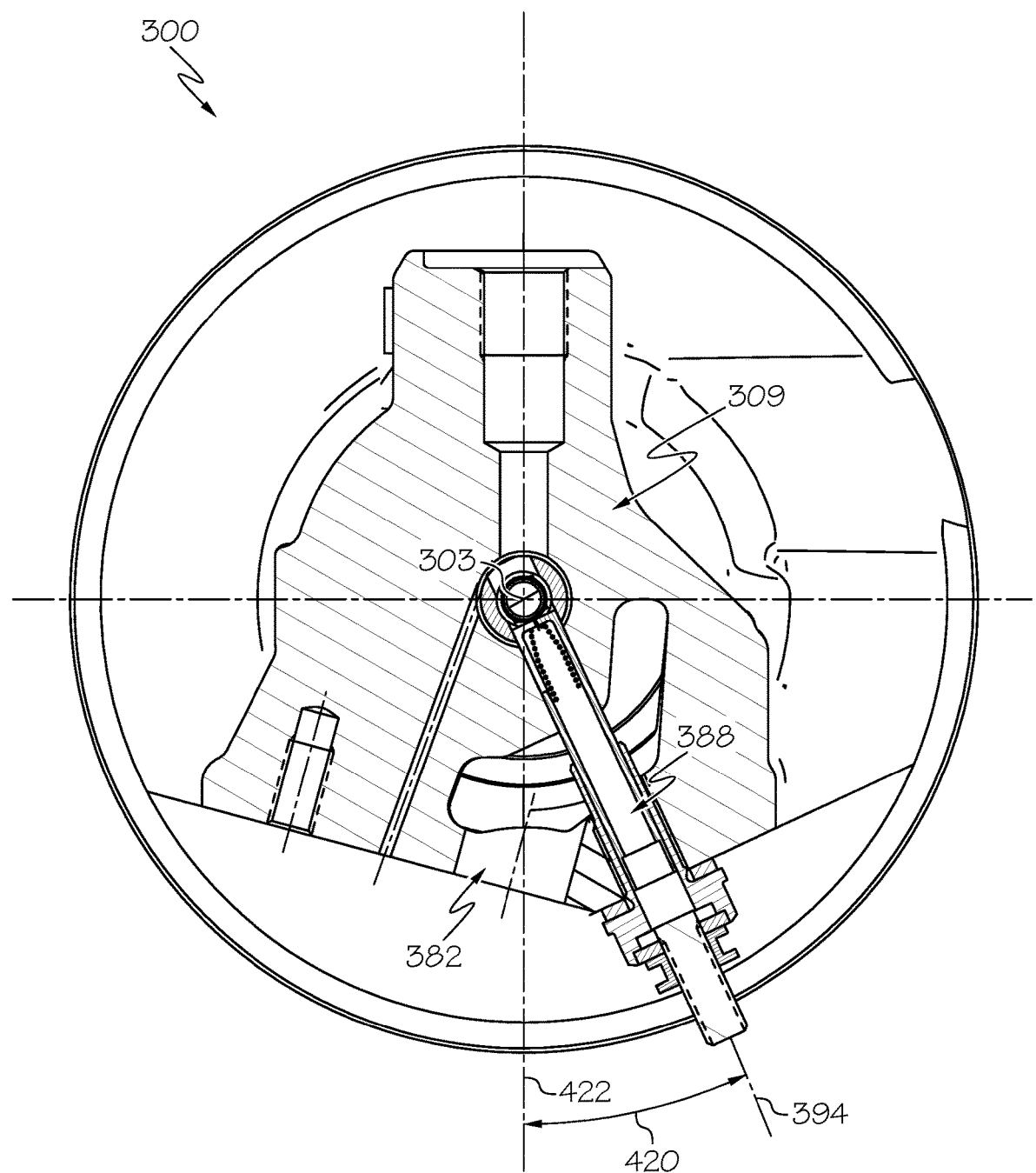
FIG. 6 is an axial section view of the turbocharger of FIG. 5.

Referring now to FIGS. 5 and 6, the turbocharger 300 is illustrated according to additional embodiments of the present disclosure. The turbocharger 300 may be substantially similar to the turbocharger 100 of FIGS. 2-4 except as noted below. Components of the turbocharger 300 that correspond to those of FIGS. 2-4 are indicated with corresponding reference numbers increased by 200.

The bearing housing 309 may be substantially similar to the bearing housing 109 of FIGS. 2-4. However, as shown in FIG. 6, for example, the circumferential position of the locating pin 388 within the bearing housing 309 may be different. For example, the axis 394 of the locating pin 388 may be disposed at a circumferential angle 420 from a vertical axis 422 to avoid interference with the oil outlet 382.

Moreover, the coolant passages 184 of the bearing housing 109 of FIGS. 2 and 3 may be omitted from the bearing housing 309 of FIGS. 5 and 6. Accordingly, the bearing housing 109 may be a so-called "air-cooled housing."

Additionally, the locating pin 388 may be threadably attached (i.e., threaded or screwed) to the bearing housing 309 and/or the bearing structure 354. In some embodiments, the heating system 400 may include the connecting line 406 for connecting to the power source 404, the control system 412, and/or the sensor 416. Furthermore, in some embodiments, the connecting line 406 may be removably attached to the heating element within the locating pin 388. This may facilitate manufacturing, in that the locating pin 388 may be rotated for threadably attaching the locating pin 388 without having to accommodate for the connecting line 406. Once the pin 388 is threadably attached, the connecting line 406 may be attached to the locating pin 388. This is in contrast to the press-fit embodiment of FIGS. 2-4, wherein the connecting line 206 may remain connected to the locating pin 188 while pressing the locating pin 188 into the bearing housing 109 and the bearing structure 154.

Accordingly, the locating pin 188, 388 of the turbocharger 100, 300 may be selectively heated to improve operating efficiency. Heating the oil may also positively impact emissions as well. It will be appreciated that the locating pin 188, 388 is especially effective at heating the lubricating oil within the bearing structure 154, 354. This is because the locating pin 188, 388 is disposed in close proximity to the oil. Specifically, as shown in FIG. 4, the first end 190 of the locating pin 188 is directly exposed to the intermediate lubricant area 172 and in close proximity to the first oil film area 166 and the second oil film area 168. Heat from the locating pin 188 may transfer quickly to these areas for improving operating efficiency of the turbocharger.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:
1. A turbocharger comprising:
a housing;

a rotor with a shaft that is housed within the housing;
a bearing structure that supports rotation of the shaft within the housing;
a lubricant area within the housing that is configured to receive a lubricant that lubricates rotation of the shaft within the housing;
a locating fastener that retains the bearing structure in a position relative to the housing, wherein the locating fastener is exposed to the lubricant area; and
a heating system with a power source, an electrical heating element supported by the locating fastener, and a connecting line that operatively connects the heating element to the power source, the power source configured to provide electrical power to the heating element for selectively heating the heating element within the locating fastener and for selectively heating the locating fastener and the lubricant within the lubricant area.

2. The turbocharger of claim 1, wherein the bearing structure and the shaft cooperatively define the lubricant area;
wherein the housing includes an inlet passage and an outlet for the lubricant;
wherein the bearing structure includes an aperture that is fluidly connected to the inlet passage and the lubricant area;
wherein a fluid path for the lubricant is defined from the inlet passage, through the aperture, to the lubricant area, and out of the housing via the outlet and
wherein the locating fastener is spaced apart from the aperture of the bearing structure.

3. The turbocharger of claim 2, wherein the bearing structure includes a first pad area, a second pad area, and an intermediate recess disposed between the first pad area and the second pad area;
wherein the intermediate recess and the shaft cooperatively define the lubricant area.

4. The turbocharger of claim 2, wherein the locating fastener includes an end;
wherein the locating fastener extends through the housing and the bearing structure with the end disposed within and exposed to the lubricant area.

5. The turbocharger of claim 1, wherein the locating fastener is press-fit within the housing.

6. The turbocharger of claim 1, wherein the locating fastener is configured to retain the bearing structure in a circumferential position relative to the housing.

7. The turbocharger of claim 6, wherein the locating fastener is configured to retain the bearing structure in an axial position relative to the housing.

8. The turbocharger of claim 1, wherein the locating fastener is threadably attached to the housing.

9. The turbocharger of claim 8,
wherein the connecting line is removably connected to the locating fastener.

10. The turbocharger of claim 1, wherein the locating fastener is a locating pin.

11. The turbocharger of claim 1, wherein the heating system includes a coil heating element that is supported within the locating fastener.

12. The turbocharger of claim 1, wherein the connecting line extends through a channel defined in the housing;
wherein the housing includes at least one of a lubricant passage and a coolant passage, the lubricant passage configured for containing the lubricant, the coolant passage configured for containing a coolant; and
wherein the channel is isolated and fluidly sealed from the lubricant passage and the coolant passage.

13. The turbocharger of claim 12, further comprising a sealing member configured to seal the channel.

14. The turbocharger of claim 1, wherein the locating fastener is disposed in a circumferential position about an axis of rotation of the shaft; and
wherein the circumferential position is disposed below a horizontal reference plane, the axis of rotation lying within the horizontal reference plane.

15. The turbocharger of claim 1,
further comprising a control system configured to control power flow from the power source to the heating element.

16. The turbocharger of claim 15, further comprising a sensor configured to detect a condition;
wherein the control system is configured to control power flow from the power source to the heating element based at least partly on the condition detected by the sensor.

17. The turbocharger of claim 16, wherein the sensor includes a thermometer.

18. A method of operating a turbocharger system for a vehicle, the method comprising:
detecting, by a sensor, a condition;
selectively providing electric power from a power source to an electric heating element supported by a locating fastener of a turbocharger based on the detected condition, the locating fastener retaining a bearing structure in a position relative to a housing of the turbocharger, the bearing structure supporting rotation of a rotor shaft of the turbocharger within the housing, the lubricant received in a lubricant area within the housing that lubricates rotation of the shaft within the housing, the locating fastener being exposed to the lubricant area, wherein selectively providing power to the electric heating element thereby selectively heats the lubricant in the lubricant area.

19. The method of claim 18, wherein detecting the condition includes detecting a temperature.

20. A turbocharger comprising:
a bearing housing with an inlet passage and an outlet for a lubricant;
a rotor with a compressor wheel, a turbine wheel, and a shaft that connects the compressor wheel and the turbine wheel, the shaft being housed within the bearing housing;
a journal bearing structure that supports rotation of the shaft within the bearing housing about an axis, the journal bearing structure and the shaft cooperatively defining a lubricant area between an outer diameter surface of the shaft and an inner diameter surface of the journal bearing structure, the journal bearing structure including an aperture that fluidly connects the inlet passage and the lubricant area;
a locating pin that extends radially with respect to the axis through bearing housing and the journal bearing structure to fix the journal bearing structure against rotation about the axis relative to the bearing housing, the locating pin including an end that is received within the lubricant area; and
a heating system coupled to the locating pin and including a sensor configured to detect an ambient temperature condition, the heating system configured for selectively heating the locating pin based on the detected ambient temperature condition, the heating system including a power source, an electrical heating element supported by the locating fastener, and a connecting line that operatively connects the heating element to the power source, the power source configured to provide electrical power to the heating element for selectively heating the heating element within the locating fastener and for selectively heating the locating fastener and the lubricant within the lubricant area;

the locating fastener spaced apart from the aperture of the bearing structure.

\* \* \* \* \*